United States Patent
Oh et al.

(10) Patent No.: US 12,027,670 B2
(45) Date of Patent: Jul. 2, 2024

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Jeong Woo Oh, Daejeon (KR); Chul Haeng Lee, Daejeon (KR); Hyung Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 969 days.

(21) Appl. No.: 16/965,441

(22) PCT Filed: Sep. 27, 2019

(86) PCT No.: PCT/KR2019/012608
§ 371 (c)(1),
(2) Date: Jul. 28, 2020

(87) PCT Pub. No.: WO2020/067779
PCT Pub. Date: Apr. 2, 2020

(65) Prior Publication Data
US 2021/0057780 A1 Feb. 25, 2021

(30) Foreign Application Priority Data
Sep. 28, 2018 (KR) .................. 10-2018-0116475

(51) Int. Cl.
*H01M 10/0569* (2010.01)
*C01D 15/00* (2006.01)
*C08G 71/04* (2006.01)
*H01M 4/131* (2010.01)
*H01M 4/62* (2006.01)
*H01M 10/0525* (2010.01)
*H01M 10/0568* (2010.01)

(52) U.S. Cl.
CPC ...... *H01M 10/0569* (2013.01); *C01D 15/005* (2013.01); *C08G 71/04* (2013.01); *H01M 4/131* (2013.01); *H01M 4/623* (2013.01); *H01M 4/625* (2013.01); *H01M 10/0525* (2013.01); *H01M 10/0568* (2013.01); *H01M 2300/0037* (2013.01); *H01M 2300/0051* (2013.01)

(58) Field of Classification Search
CPC .. H01M 10/0569; H01M 4/131; H01M 4/623; H01M 4/625; H01M 10/0525; H01M 10/0568; H01M 2300/0037; H01M 2300/0051; H01M 10/0567; H01M 10/052; C01D 15/005; C08G 71/04
See application file for complete search history.

(56) References Cited

U.S. PATENT DOCUMENTS

| | | | |
|---|---|---|---|
| 2002/0127476 A1 | 9/2002 | Teshima et al. | |
| 2012/0183865 A1* | 7/2012 | Deguchi | H01M 10/0525 429/331 |
| 2017/0229735 A1* | 8/2017 | Ahn | H01M 10/0567 |
| 2018/0342767 A1 | 11/2018 | Ahn et al. | |
| 2019/0074545 A1 | 3/2019 | Jeong et al. | |
| 2021/0057780 A1 | 2/2021 | Oh et al. | |

FOREIGN PATENT DOCUMENTS

| | | | |
|---|---|---|---|
| CN | 105552430 | A | 5/2016 |
| CN | 107078342 | A | 8/2017 |
| CN | 108352569 | A | 7/2018 |
| EP | 3699998 | A1 | 8/2020 |
| IN | 202017024113 | | 1/2021 |
| JP | 2005319459 | A | 11/2005 |
| JP | 2012241060 | A | 12/2012 |
| JP | 2013218967 | A | 10/2013 |
| JP | 2017532742 | A | 11/2017 |
| JP | 7055884 | B2 | 4/2022 |
| KR | 20020055572 | A | 7/2002 |
| KR | 100645778 | B1 | 11/2006 |
| KR | 20160040127 | A | 4/2016 |
| KR | 20170110995 | A | 10/2017 |
| KR | 20170142929 | A | 12/2017 |
| KR | 20180026358 | A | 3/2018 |
| KR | 20180036380 | A | 4/2018 |
| KR | 20180066724 | A | 6/2018 |
| KR | 20190017477 | A | 2/2019 |
| WO | 2018044129 | A1 | 3/2018 |

OTHER PUBLICATIONS

Extended European Search Report including Written Opinion for Application No. 19865995.5 dated Jan. 29, 2021, pp. 1-9.
International Search Report for Application No. PCT/KR2019/012608 dated Jan. 2, 2020, 2 pages.

* cited by examiner

*Primary Examiner* — Lisa S Park
(74) *Attorney, Agent, or Firm* — Lerner David LLP

(57) ABSTRACT

A non-aqueous electrolyte solution and a lithium secondary battery including the same are disclosed herein. In some embodiments, a non-aqueous electrolyte solution includes a lithium salt, a first organic solvent that is ethylene carbonate, a second organic solvent excluding ethylene carbonate, and an oligomer represented by Formula 1 wherein a concentration of the lithium salt is 1.2 M to 3.3 M, and, wherein the first organic solvent is included in an amount of 0.1 wt % to 12 wt % based on a total weight of the non-aqueous electrolyte solution.

17 Claims, No Drawings

NON-AQUEOUS ELECTROLYTE SOLUTION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/012608, filed Sep. 27, 2019, which claims priority from Korean Patent Application No. 10-2018-0116475, filed Sep. 28, 2018, the disclosures of which are incorporated herein by reference.

TECHNICAL FIELD

The present invention relates to a non-aqueous electrolyte solution having improved high-temperature and low-temperature stabilities and a lithium secondary battery in which high-temperature storage characteristics, low-temperature output characteristics, and cycle life characteristics are improved by including the non-aqueous electrolyte solution.

BACKGROUND ART

Demand for secondary batteries as an energy source has been significantly increased as technology development and demand with respect to mobile devices have increased, and, among these secondary batteries, lithium secondary batteries having high energy density and high voltage have been commercialized and widely used.

A lithium secondary battery is prepared by a process in which, after a current collector is coated with an electrode active material of appropriate thickness or the electrode active material itself is formed in the form of a film having an appropriate length, the resultant product is wound or stacked with an insulating separator to prepare an electrode assembly, the electrode assembly is accommodated in a can or a container similar thereto, and an electrolyte is then injected thereinto.

Charge and discharge of the lithium secondary battery is performed while a process of intercalating and deintercalating lithium ions from a lithium metal oxide positive electrode into and out of a graphite negative electrode is repeated. In this case, since lithium is highly reactive, lithium reacts with the carbon electrode to form $Li_2CO_3$, LiO, or LiOH, and thus, a film is formed on a surface of the negative electrode.

The film is denoted as "solid electrolyte interface (SEI)", wherein the SEI formed at an initial stage of charging prevents a reaction of the lithium ions with the carbon negative electrode or other materials during charge and discharge. Also, the SEI only passes the lithium ions by acting as an ion tunnel. The ion tunnel plays a role in preventing the collapse of a structure of the carbon negative electrode due to the co-intercalation of the carbon negative electrode and organic solvents of an electrolyte solution having a high molecular weight which solvates lithium ions and moves therewith.

Therefore, in order to improve high-temperature storage characteristics and cycle life characteristics of the lithium secondary battery, a robust SEI must be formed on the negative electrode of the lithium secondary battery. When the SEI is once formed during the first charge, the SEI may prevent the reaction of the lithium ions with the negative electrode or other materials during repeated charge and discharge cycles caused by the subsequent use of the battery, and the SEI may act as an ion tunnel that only passes the lithium ions between the electrolyte solution and the negative electrode.

Since a type or addition amount of a non-aqueous organic solvent, an electrolyte solution additive, or a lithium salt included in a conventional electrolyte solution is adjusted as needed, there was a limitation in that irreversible capacity of the secondary battery is increased and output characteristics are degraded due to decomposition of a surface of the positive electrode during high-temperature storage or a continuous reaction between the negative electrode and the electrolyte solution caused by degradation of the SEI.

In order to address the limitation, an organic solvent based on ethylene carbonate (EC), which may improve output characteristics, has been used instead of a propylene carbonate solvent capable of causing an irreversible decomposition reaction with a graphite material.

However, the ethylene carbonate is disadvantageous in that its operating temperature is limited due to a high melting point, high-temperature characteristics may be difficult to be maintained, and battery performance is significantly reduced at a low temperature.

Thus, there is a need to develop a technique for providing a non-aqueous electrolyte solution having improved high-temperature storage characteristics and cycle life characteristics by improving the disadvantages which may occur when the ethylene carbonate is used as an organic solvent.

PRIOR ART DOCUMENT

Korean Patent Application Laid-open Publication No. 2017-0110995

DISCLOSURE OF THE INVENTION

Technical Problem

An aspect of the present invention provides a non-aqueous electrolyte solution which includes an oligomer having a specific structure and simultaneously minimizes an amount of ethylene carbonate, as a first organic solvent, to improve high-temperature and low-temperature stabilities.

Another aspect of the present invention provides a lithium secondary battery in which high-temperature storage characteristics, low-temperature output characteristics, and cycle life characteristics are excellent by including the non-aqueous electrolyte solution.

Technical Solution

According to an aspect of the present invention, there is provided a non-aqueous electrolyte solution including:

a 1.2 M to 3.3 M lithium salt, a first organic solvent composed of ethylene carbonate, a second organic solvent excluding the ethylene carbonate, and an oligomer represented by Formula 1 as a first additive, wherein the first organic solvent is included in an amount of 0.1 wt % to 12 wt % based on a total weight of the non-aqueous electrolyte solution.

[Formula 1]

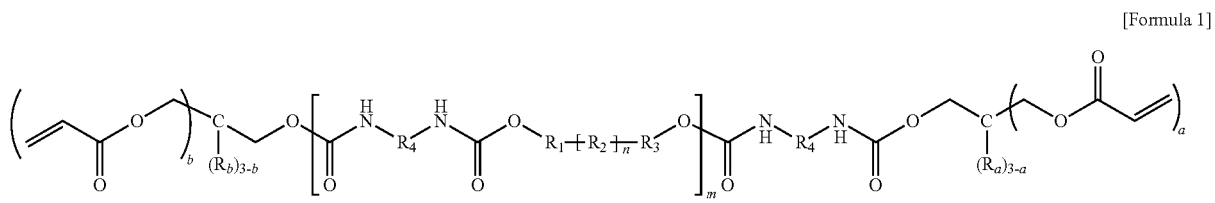

In Formula 1, $R_1$ is an alkylene group having 1 to 5 carbon atoms which is substituted or unsubstituted with at least one fluorine element or $R_1'$—O—, wherein $R_1'$ is an alkylene group having 1 to 5 carbon atoms which is substituted or unsubstituted with at least one fluorine element, $R_2$ is an alkylene group having 1 to 5 carbon atoms which is substituted or unsubstituted with at least one fluorine element or $R_2'$—O—, wherein $R_2'$ is an alkylene group having 1 to 5 carbon atoms which is substituted or unsubstituted with at least one fluorine element, $R_3$ is an alkylene group having 1 to 5 carbon atoms which is substituted or unsubstituted with at least one fluorine element or $R_3'$—O—, wherein $R_3'$ is an alkylene group having 1 to 5 carbon atoms which is substituted or unsubstituted with at least one fluorine element, $R_4$ is an aliphatic hydrocarbon group or an aromatic hydrocarbon group, $R_a$ and $R_b$ are each independently hydrogen or an alkyl group having 1 to 3 carbon atoms, m and n are each independently an integer of 1 to 5, and a and b are each independently an integer of 1 to 3.

According to another aspect of the present invention, there is provided a lithium secondary battery including the non-aqueous electrolyte solution according to the present invention.

Advantageous Effects

A non-aqueous electrolyte solution of the present invention may improve its impregnability by including a high-concentration lithium salt and an oligomer having a specific structure. Also, since the non-aqueous electrolyte solution of the present invention decreases resistance due to Li-ion depletion during high-rate charge and discharge by including ethylene carbonate having low oxidation stability and thermal stability in an amount of 10 wt % or less, high-temperature and low-temperature stabilities may be improved. Thus, if the non-aqueous electrolyte solution of the present invention including the oligomer having a specific structure and 10 wt % or less of the ethylene carbonate is used, a secondary battery having improved high-temperature storage characteristics, low-temperature output characteristics, and cycle life characteristics may be achieved.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2(CH_2)CH$—, $CH(CH_2)CH_2$—, and —$CH(CH_2)CH_2CH_2$—.

In this case, the expression "alkylene group" denotes a branched or unbranched divalent unsaturated hydrocarbon group. In an embodiment, the alkylene group may be substituted or unsubstituted. The alkylene group may include a methylene group, an ethylene group, a propylene group, an isopropylene group, a butylene group, an isobutylene group, a tert-butylene group, a pentylene group, and 3-pentylene group, but the present invention is not limited thereto, and each thereof may be selectively substituted in another exemplary embodiment.

Also, unless otherwise defined in the specification, the expression "substitution" denotes that at least one hydrogen bonded to carbon is substituted with an element other than hydrogen, for example, an alkyl group having 1 to 5 carbon atoms or a fluorine element.

Furthermore, unless otherwise specified in the present invention, the expression "*" denotes the same or different atom or a portion connected between ends of a formula.

Also, unless otherwise defined in the specification, the expression "molecular weight" denotes a weight-average molecular weight (Mw).

As a result of a significant amount of research conducted into improving high-temperature and low-temperature characteristics of a non-aqueous electrolyte solution including ethylene carbonate having low oxidation stability and thermal stability as an organic solvent, the present inventors found that high-temperature storage characteristics and low-temperature output characteristics of the non-aqueous electrolyte solution are improved when an oligomer having a specific structure is included and an amount of the ethylene carbonate having low oxidation stability and thermal stability is simultaneously adjusted to be 10 wt % or less, and, furthermore, when a lithium salt having a high concentration of 1.2 M or more is included, thereby leading to the completion of the present invention.

Non-Aqueous Electrolyte Solution

Specifically, a non-aqueous electrolyte solution of the present invention includes:

a 1.2 M to 3.3 M lithium salt, a first organic solvent composed of ethylene carbonate, a second organic solvent excluding the ethylene carbonate, and an oligomer represented by Formula 1 as a first additive, wherein the first organic solvent is included in an amount of 0.1 wt % to 12 wt % based on a total weight of the non-aqueous electrolyte solution.

lithium bisperfluoroethanesulfonimide (LiBETI, LiN$(SO_2CF_2CF_3)_2$), and lithium (bis) trifluoromethanesulfonimide (LiTFSI, LiN$(SO_2CF_3)_2$) or a mixture of two or more thereof, and, more specifically, the lithium salt may include at least one selected from the group consisting of LiPF$_6$, Li$(CF_3SO_2)_2$N, Li$(FSO_2)_2$N, and Li$(CF_3CF_2SO_2)_2$N.

The lithium salt may be appropriately changed in a normally usable range, but may be included in a concentration of 1.2 M or more, for example, 1.2 M to 3.3 M, particularly 1.5 M to 3.3 M, and more particularly 2 M to 3.2 M to obtain an optimum effect of forming a film for preventing corrosion of a surface of the electrode.

Currently, reaction heat generated by an electrochemical (e.g., overcharge) or chemical (e.g., hot box) reaction in

[Formula 1]

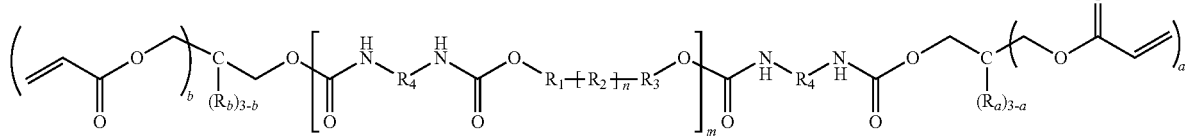

In Formula 1, $R_1$ is an alkylene group having 1 to 5 carbon atoms which is substituted or unsubstituted with at least one fluorine element or $R_1'$—O—, wherein $R_1'$ is an alkylene group having 1 to 5 carbon atoms which is substituted or unsubstituted with at least one fluorine element, $R_2$ is an alkylene group having 1 to 5 carbon atoms which is substituted or unsubstituted with at least one fluorine element or $R_2'$—O—, wherein $R_2'$ is an alkylene group having 1 to 5 carbon atoms which is substituted or unsubstituted with at least one fluorine element, $R_3$ is an alkylene group having 1 to 5 carbon atoms which is substituted or unsubstituted with at least one fluorine element or $R_3'$—O—, wherein $R_3'$ is an alkylene group having 1 to 5 carbon atoms which is substituted or unsubstituted with at least one fluorine element, $R_4$ is an aliphatic hydrocarbon group or an aromatic hydrocarbon group, $R_a$ and $R_b$ are each independently hydrogen or an alkyl group having 1 to 3 carbon atoms, m and n are each independently an integer of 1 to 5, and a and b are each independently an integer of 1 to 3.

(1) Lithium Salt

The lithium salt is a lithium salt used in a common non-aqueous electrolyte solution, wherein, specifically, the lithium salt may include Li$^+$ as a cation, and may include one selected from the group consisting of F$^-$, Cl$^-$, Br$^-$, I$^-$, NO$_3^-$, N(CN))$_2^-$, ClO$_4^-$, BF$_4^-$, AlO$_4^-$, AlCl$_4^-$, PF$_6^-$, SbF$_6^-$, AsF$_6^-$, BF$_2$C$_2$O$_4^-$, BC$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$ as an anion, and, in addition thereto, a lithium salt typically used in an electrolyte solution of a lithium secondary battery may be used without limitation.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiCF$_3$SO$_3$, LiCH$_3$CO$_2$, LiCF$_3$CO$_2$, LiAsF$_6$, LiSbF$_6$, LiCH$_3$SO$_3$, lithium bis(fluorosulfonyl)imide (LiFSI, LiN(SO$_2$F)$_2$), most secondary batteries increases an internal temperature of the battery, and, when the temperature reaches a temperature above an ignition point, since surrounding oxygen is combined to lead to a thermal-runaway phenomenon, the secondary battery may be ignited. Thus, a reduction in calorific value of an electrolyte has emerged as a very important factor in order to increase high-temperature safety of the secondary battery.

With respect to the non-aqueous electrolyte solution of the present invention, resistance due to Li-ion depletion during high-rate charge and discharge may be reduced by including a high-concentration lithium salt having a concentration of 1.2 M or more, particularly, 1.5 M or more.

Furthermore, in the non-aqueous electrolyte solution of the present invention, in a case in which the concentration of the lithium salt satisfies the above range, high lithium cation (LiI transfer characteristics (that is, cation transference number) may be secured due to an increase in lithium cations present in the non-aqueous electrolyte solution, and an effect of reducing diffusion resistance of lithium ions may be achieved to obtain an effect of improving cycle capacity characteristics. In a case in which the concentration of the lithium salt is 3.3 M or less, for example, 3.2 M or less, an increase in viscosity of the electrolyte solution may be prevented while securing moving speed of the lithium ions. In a case in which the maximum concentration of the lithium salt is greater than 3.3 M, the viscosity of the non-aqueous electrolyte solution may be excessively increased to reduce electrolyte solution impregnability.

(2) First Organic Solvent

Ethylene carbonate may be included as the first organic solvent, and may be included in an amount of 0.1 wt % to 12 wt %, particularly 1 wt % to 10 wt %, and more particularly 3 wt % to 10 wt % based on the total weight of the non-aqueous electrolyte solution.

The ethylene carbonate is a solvent having a high dielectric constant, wherein the ethylene carbonate is advantageous in that it may improve output characteristics by increasing ionic conductivity of the electrolyte solution when it is used in the electrolyte solution. However, with respect to the ethylene carbonate, since its melting point is high and high-temperature characteristics are difficult to be maintained, it is disadvantageous in that its operating temperature is limited and oxidation stability and thermal stability are reduced during high-temperature storage.

Thus, in the present invention, since the ethylene carbonate, as the first organic solvent, is included in an amount of 12 wt % or less, for example, 10 wt % or less based on the total weight of the non-aqueous electrolyte solution, ionic conductivity of the non-aqueous electrolyte solution may be increased to secure output characteristics as well as high-temperature storage characteristics and low-temperature output characteristics of the non-aqueous electrolyte solution. If the ethylene carbonate, as the first organic solvent, is included in an amount of less than 0.1 wt %, since a robust solid electrolyte interface (SEI) is difficult to be formed, irreversible capacity of the secondary battery is increased by a continuous side reaction between a negative electrode and the electrolyte solution and the output characteristics may be degraded. Also, if the amount of the ethylene carbonate is 10 wt % or more and is particularly greater than 12 wt %, since the oxidation stability and low-temperature performance of the non-aqueous electrolyte solution are deteriorated, storage characteristics and cycle life characteristics of the non-aqueous electrolyte show a tendency to deteriorate in an exothermic environment that affects oxidation and decomposition reactions of the non-aqueous electrolyte solution, such as overcharge and hot box.

(3) Second Organic Solvent

The second organic solvent is not particularly limited as long as it may minimize the decomposition due to the oxidation reaction during charge and discharge of the secondary battery and may exhibit desired characteristics with an additive, and the second organic solvent may specifically include at least one organic solvent selected from the group consisting of a cyclic carbonate-based organic solvent excluding ethylene carbonate, a linear carbonate-based organic solvent, a linear ester-based organic solvent, and a cyclic ester-based organic solvent.

Specific examples of the cyclic carbonate-based organic solvent excluding ethylene carbonate may be at least one organic solvent selected from the group consisting of propylene carbonate (PC), 1,2-butylene carbonate, 2,3-butylene carbonate, 1,2-pentyelne carbonate, 2,3-pentyelne carbonate, vinylene carbonate, and fluoroethylene carbonate (FEC).

Also, specific examples of the linear carbonate-based organic solvent may be at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and, among these, the linear carbonate-based organic solvent may include ethylmethyl carbonate (EMC).

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Specific examples of the cyclic ester-based organic solvent may be at least one organic solvent selected from the group consisting of γ-butyrolactone, γ-valerolactone, γ-caprolactone, σ-valerolactone, and ε-caprolactone.

Specifically, in order to prepare a non-aqueous electrolyte solution having high ionic conductivity in the present invention, it is desirable that the first organic solvent is mixed with the linear carbonate-based organic solvent having low viscosity and low dielectric constant and used.

Also, in the present invention, at least one organic solvent of the cyclic carbonate-based organic solvent excluding the first organic solvent, the linear carbonate-based organic solvent, the linear ester-based organic solvent, and the cyclic ester-based organic solvent may be further included in a mixed solvent of the first organic solvent and the linear carbonate-based organic solvent.

The second organic solvent may be included in a residual amount excluding the first organic solvent and the additive based on the total weight of the non-aqueous electrolyte.

(4) First Additive

The non-aqueous electrolyte solution of the present invention may include an oligomer represented by the following Formula 1 as a first additive to reduce viscosity and surface tension.

[Formula 1]

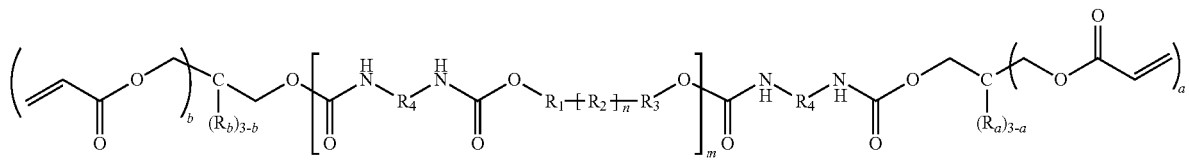

In Formula 1, $R_1$ is an alkylene group having 1 to 5 carbon atoms which is substituted or unsubstituted with at least one fluorine element or $R_1'$—O—, wherein $R_1'$ is an alkylene group having 1 to 5 carbon atoms which is substituted or unsubstituted with at least one fluorine element, $R_2$ is an alkylene group having 1 to 5 carbon atoms which is substituted or unsubstituted with at least one fluorine element or $R_2'$—O—, wherein $R_2'$ is an alkylene group having 1 to 5 carbon atoms which is substituted or unsubstituted with at least one fluorine element, $R_3$ is an alkylene group having 1 to 5 carbon atoms which is substituted or unsubstituted with at least one fluorine element or $R_3'$—O—, wherein $R_3'$ is an alkylene group having 1 to 5 carbon atoms which is substituted or unsubstituted with at least one fluorine element, $R_4$ is an aliphatic hydrocarbon group or an aromatic hydrocarbon group, $R_a$ and $R_b$ are each independently hydrogen or an alkyl group having 1 to 3 carbon atoms, m and n are each independently an integer of 1 to 5, and a and b are each independently an integer of 1 to 3.

In general, in a case in which the lithium salt is included in a high concentration of 1.2 M or more in the non-aqueous electrolyte solution, electrolyte wetting properties may be reduced while the viscosity of the non-aqueous electrolyte solution is increased. In the present invention, the surface tension and viscosity of the non-aqueous electrolyte solution, which are increased by the high-concentration lithium salt, may be reduced by including the oligomer represented by Formula 1 as the first additive.

That is, with respect to a polymer having a common alkylene oxide skeleton which is used in a conventional non-aqueous electrolyte solution, since reduction safety is low, a film easily broken at high temperatures is formed on a surface of the negative electrode during initial charge. The film is disadvantageous in that it causes a side reaction to increase interfacial resistance between the electrode and the electrolyte solution.

In contrast, since the oligomer represented by Formula 1 of the present invention contains a urethane group (—NH—C(O)O—) and a fluorine-substituted alkylene group, as a hydrophobic part, in its main chain as well as an acrylate functional group as a hydrophilic group capable of forming a crosslink at both ends of the main chain by itself, the oligomer represented by Formula 1 of the present invention may exhibit a balanced affinity for a positive electrode or separator (SRS layer), as a hydrophilic part, and a negative electrode or separator fabric, as a hydrophobic part, to act as a surfactant.

Thus, since the non-aqueous electrolyte solution of the present invention may improve the interfacial resistance by reducing the surface tension with the electrode by further including the oligomer represented by Formula 1 even if the viscosity is increased by including the high-concentration lithium salt having a concentration of 1.2 M or more, particularly, 1.5 M or more, an effect of improving electrolyte solution impregnability with respect to the electrode and separator may be obtained.

Furthermore, since the oligomer represented by Formula 1 is electrochemically stable, the oligomer represented by Formula 1 not only has high reduction stability, but also possesses the ability to dissociate the lithium salt, and thus, the oligomer represented by Formula 1 may minimize a reduction reaction on the surface of the negative electrode and may improve lithium ion mobility.

Therefore, with respect to the non-aqueous electrolyte solution of the present invention including the oligomer represented by Formula 1, since a side reaction with the electrode is reduced and an effect of stabilizing an interface between the electrode and the electrolyte is improved in comparison to a non-aqueous electrolyte solution using a polymer having a skeleton of alkylene oxide, such as ethylene oxide, propylene oxide, or butylene oxide, which has been commercialized during the preparation of a conventional non-aqueous electrolyte solution, or dialkyl siloxane, fluorosiloxane, or a graft polymer and a block copolymer having units thereof, initial output characteristics and cycle life characteristics of the lithium secondary battery may be improved.

In Formula 1, $R_4$ may be an aliphatic hydrocarbon group.

The aliphatic hydrocarbon group may include an alicyclic hydrocarbon group or a linear hydrocarbon group. Specifically, the alicyclic hydrocarbon group may include at least one selected from the group consisting of a substituted or unsubstituted cycloalkylene group having 4 to 20 carbon atoms; a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in Formula 1, $R_4$ may be an aromatic hydrocarbon group.

The aromatic hydrocarbon group may include a substituted or unsubstituted arylene group having 6 to 20 carbon atoms; or a substituted or unsubstituted heteroarylene group having 2 to 20 carbon atoms.

Specifically, in Formula 1, $R_1$ is $R_1'$—O—, wherein $R_1'$ may be an alkylene group having 1 to 5 carbon atoms which is substituted or unsubstituted with at least one fluorine element, $R_2$ is $R_2'$—O—, wherein $R_2'$ may be an alkylene group having 1 to 5 carbon atoms which is substituted or unsubstituted with at least one fluorine element, $R_3$ may be an alkylene group having 1 to 5 carbon atoms which is substituted or unsubstituted with at least one fluorine element, and $R_4$ may be an aliphatic hydrocarbon group.

More specifically, in Formula 1, $R_1$ is $R_1'$—O—, wherein $R_1'$ may be an alkylene group having 1 to 3 carbon atoms which is substituted or unsubstituted with at least one fluorine element, $R_2$ is $R_2'$—O—, wherein $R_2'$ may be an alkylene group having 1 to 3 carbon atoms which is substituted or unsubstituted with at least one fluorine element, $R_3$ may be an alkylene group having 1 to 3 carbon atoms which is substituted or unsubstituted with at least one fluorine element, and $R_4$ may be an aliphatic hydrocarbon group.

Specifically, the oligomer represented by Formula 1 may be an oligomer represented by Formula 1a below.

[Formula 1a]

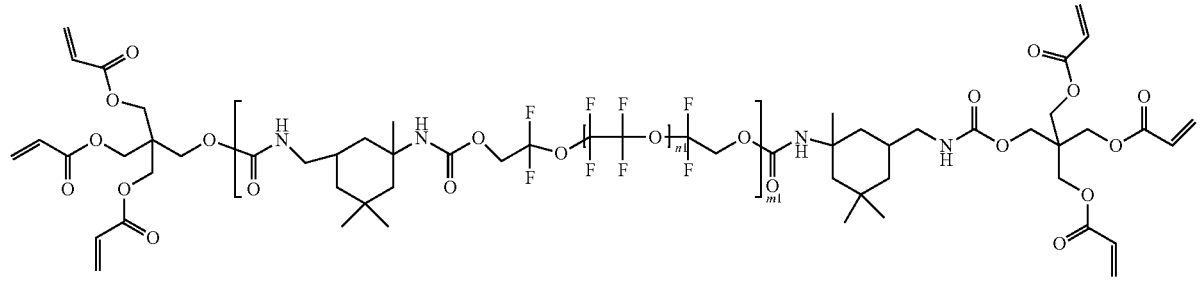

In Formula 1a,
m1 and n1 are each independently an integer of 1 to 5.
Specifically, in Formula 1a, m1 and n1 are each independently an integer of 3 to 5.
Also, the oligomer represented by Formula 1 may be included in an amount of 0.1 wt % to 22 wt %, particularly 0.1 wt % to 20 wt %, and more particularly 0.5 wt % to 10 wt % based on the total weight of the non-aqueous electrolyte solution.

In a case in which the amount of the oligomer is 0.1 wt % or more, the impregnability of the non-aqueous electrolyte solution with respect to the electrode may be improved by reducing the surface tension, and, in a case in which the amount of the oligomer is 22 wt % or less, for example, 20 wt % or less, it is possible to prevent disadvantages such as an increase in resistance due to the excessive amount of the oligomer added and the resulting capacity reduction and limitation of movement of lithium ions, for example, a decrease in ionic conductivity.

A range of weight-average molecular weight (Mw) of the oligomer represented by Formula 1 may be controlled by the number of repeating units, and the weight-average molecular weight (Mw) of the oligomer represented by Formula 1 may be in a range of 1,000 g/mol to 100,000 g/mol, particularly 1,000 g/mol to 50,000 g/mol, and more particularly 1,000 g/mol to 10,000 g/mol. Preferably, the weight-average molecular weight (Mw) of the oligomer represented by Formula 1 may be in a range of 1,000 g/mol to 5,000 g/mol.

In a case in which the weight-average molecular weight of the oligomer is within the above range, mechanical strength of the non-aqueous electrolyte solution including the oligomer may be effectively improved.

If the weight-average molecular weight of the oligomer represented by Formula 1 is less than 1,000 g/mol, since adequate mechanical strength may not be expected and the use of a greater amount of a polymerization initiator is required or a demanding additional polymerization process is required, a gel polymer electrolyte formation process may be complicated. If the weight-average molecular weight of the oligomer is greater than 100,000 g/mol, since physical properties of the oligomer itself become rigid and the affinity with the electrolyte solvent is decreased, dissolution is difficult, and thus, the formation of a uniform and excellent gel polymer electrolyte may not be expected.

The weight-average molecular weight may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated from the results obtained using an analytical method (system: Alliance 4, column: Ultrahydrogel linearX2, eluent: 0.1M $NaNO_3$ (pH 7.0 phosphate buffer, flow rate: 0.1 mL/min, temp: 40° C., injection: 100 μL).

(5) Second Additive

Also, the non-aqueous electrolyte solution of the present invention may further include at least one compound of a fluorine-containing aromatic compound having 9 or less carbon atoms, a carbonate ester compound having an unsaturated bond, and an acid anhydride to improve storage characteristics and cycle characteristics of the non-aqueous electrolyte solution during overcharge.

Specifically, the fluorine-containing aromatic compound having 9 or less carbon atoms may include at least one selected from the group consisting of fluorobenzene, 1,2-difluorobenzene, 1,3-difluorobenzene, 1,4-difluorobenzene, 1,2,3-trifluorobenzene, 1,2,4-trifluorobenzene, 1,3,5-trifluorobenzene, 1,2,3,4-tetra fluorobenzene, 1,2,3,5-tetra fluorobenzene, 1,2,4,5-tetra fluorobenzene, pentafluorobenzene, hexafluorobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, benzotrifluoride, 2-fluorobenzo trifluoride, 3-fluorobenzo trifluoride, 4-fluorobenzo trifluoride, 3-fluoro-o-xylene, 4-fluoro-o-xylene, 2-fluoro-m-xylene, 5-fluoro-m-xylene, 2-methylbenzo trifluoride, 3-methylbenzo trifluoride, 4-methylbenzo trifluoride, and octafluorotoluene.

The fluorine-containing aromatic compound may be included in an amount of 0.01 wt % or more to 10 wt % or less, for example, 0.1 wt % to 5 wt % or less based on the total weight of the non-aqueous electrolyte solution. If the amount of the fluorine-containing aromatic compound is less than 0.01 wt %, an effect of improving overcharge safety is insignificant, and, if the amount of the fluorine-containing aromatic compound is greater than 10 wt %, since resistance is increased due to the excessive amount of the additive, there is a possibility that a side reaction in the electrolyte solution excessively occurs during the charge and discharge of the battery.

Furthermore, as a specific example, the carbonate ester compound having an unsaturated bond may include at least one of a vinylene carbonate compound, such as vinylene carbonate, methyl vinylene carbonate, ethyl vinylene carbonate, 4,5-dimethylvinylene carbonate, 4,5-diethyl vinylene carbonate, fluoroethylene carbonate, or trifluoromethyl vinylene carbonate; a vinylethylene carbonate, such as 4-vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, or 4,5-divinyl ethylene carbonate; and a methylene ethylene carbonate compound, such as 4,4-dimethyl-5-methylene ethylene carbonate or 4,4-diethyl-5-methylene ethylene carbonate. Among them, vinylene carbonate, 4-vinyl ethylene carbonate, 4-methyl-4-vinyl ethylene carbonate, or 4,5-divinyl ethylene carbonate, particularly, vinylene carbonate or 4-vinyl ethylene carbonate is preferable, and a mixture of two or more thereof may be used.

The carbonate ester compound having an unsaturated bond may be included in an amount of 0.01 wt % or more to 10 wt % or less, for example, 0.1 wt % to 5 wt % or less based on the total weight of the non-aqueous electrolyte solution. If the amount of the carbonate ester compound having an unsaturated bond is less than 0.01 wt %, an effect of improving cycle characteristics may be insignificant, and, if the amount of the carbonate ester compound having an unsaturated bond is greater than 10 wt %, since gas is generated during high-temperature storage, an internal pressure of the battery may increase.

Also, as a representative example, the acid anhydride may include at least one carboxy anhydride selected from the group consisting of succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride.

The acid anhydride may be included in an amount of 0.01 wt % or more to 10 wt % or less, for example, 0.1 wt % to 5 wt % or less based on the total weight of the non-aqueous electrolyte solution. If the amount of the acid anhydride is less than 0.01 wt %, the effect of improving cycle characteristics may be insignificant, and, if the amount of the acid anhydride is greater than 10 wt %, there is a possibility that the side reaction in the non-aqueous electrolyte solution excessively occurs during the charge and discharge of the battery.

(6) Additional Additive

Furthermore, in order to further improve low-temperature high-rate discharge characteristics, high-temperature stability, overcharge protection, and an effect of improving swelling during high-temperature storage, the non-aqueous electrolyte solution for a lithium secondary battery of the present invention may further include an additional additive capable of forming a more stable ion conductive film on the surface of the electrode, if necessary.

As a representative example, the additional additive may include at least one compound selected from the group consisting of a sultone-based compound, a sulfate-based compound, a nitrile-based compound, a phosphate-based compound, a borate-based compound, and a lithium salt-based compound.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1, 3-propene sultone.

The sulfate-based compound may include ethylene sulfate (Esa), trimethylene sulfate (TMS), or methyl trimethylene sulfate (MTMS), and may be included in an amount of 3 wt % or less based on the total weight of the non-aqueous electrolyte solution.

The nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The nitrile-based compound may be included in an amount of 5 wt % to 8 wt %, for example, 6 wt % to 8 wt % based on the total weight of the non-aqueous electrolyte solution. In a case in which the total amount of the nitrile-based compound in the non-aqueous electrolyte solution is greater than 8 wt %, since the resistance is increased due to an increase in the film formed on the surface of the electrode, battery performance may be degraded.

The phosphate-based compound may include at least one compound selected from the group consisting of lithium difluoro bis(oxalato)phosphate, lithium difluorophosphate, trimethylsilyl phosphite, and tris(2,2,2-trifluoroethyl)phosphate, and may be included in an amount of 3 wt % or less based on the total weight of the non-aqueous electrolyte solution.

The borate-based compound may include tetraphenylborate or lithium oxalyldifluoroborate, and may be included in an amount of 3 wt % or less based on the total weight of the non-aqueous electrolyte solution.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis (oxalato) borate ($LiB(C_2O_4)_2$)), and $LiBF_4$, and may be included in an amount of 3 wt % or less based on the total weight of the non-aqueous electrolyte solution.

The additives may be used as a mixture of two or more thereof, and may be included in an amount of 20 wt % or less, particularly 0.01 wt % to 20 wt %, and more particularly 0.1 wt % to 10 wt %, for example, 0.1 wt % to 5 wt % based on the total weight of the non-aqueous electrolyte solution. If the amount of the additives is greater than 20 wt %, there is a possibility that the side reaction in the non-aqueous electrolyte solution occurs excessively during charge and discharge of the battery. Particularly, since the additives for forming an SEI may not be sufficiently decomposed at high temperatures when excessive amounts of the additives for forming an SEI are added, the additives for forming an SEI may be present in the form of an unreacted material or precipitates in the electrolyte solution at room temperature. Accordingly, a side reaction may occur in which life or resistance characteristics of the secondary battery are degraded.

Lithium Secondary Battery

Also, in the present invention, a lithium secondary battery including the above-described non-aqueous electrolyte solution may be provided.

The lithium secondary battery includes a positive electrode including a positive electrode active material, a negative electrode including a negative electrode active material, a separator disposed between the positive electrode and the negative electrode, and the above-described non-aqueous electrolyte solution.

Specifically, the lithium secondary battery of the present invention may be prepared by injecting the non-aqueous electrolyte solution of the present invention into an electrode assembly formed by sequentially stacking the positive electrode, the negative electrode, and the separator selectively disposed between the positive electrode and the negative electrode. In this case, any positive electrode, negative electrode, and separator, which have typically been used in the preparation of a lithium secondary battery, may be used as the positive electrode, negative electrode, and separator which constitute the electrode assembly.

The positive electrode and the negative electrode, which constitute the lithium secondary battery of the present invention, may be prepared by a conventional method and used.

(1) Positive Electrode

The positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), etc.), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion may be improved, but the amount of the positive electrode active material is reduced to such an extent that battery capacity may be reduced.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Furthermore, the conductive agent may be added in an amount of 1 wt % to 20 wt % based on the total weight of the solid content in the positive electrode slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

As the solvent, N-methyl-2-pyrrolidone (NMP), dimethyl sulfoxide (DMSO), isopropyl alcohol, acetone, or water may be used alone or a mixture thereof may be used. An amount of the solvent used may be appropriately adjusted in consideration of a coating thickness, production yield, and viscosity, and, for example, the solvent may be included in an amount such that a concentration of the solid content in the positive electrode slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \le 1$; $1 \le y \le 3$; $1 \le z \le 8$) may be used as the metal composite oxide.

The material, which may be doped and undoped with lithium, may include Si, $SiO_x$ ($0 < x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 75 wt %, for example, 50 wt % to 65 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

After 10 g of ethylene carbonate and 86.5 g (volume ratio of about 1:11) of ethyl methyl carbonate were mixed, a non-aqueous organic solvent was prepared by dissolving $LiPF_6$ to have a concentration of 1.5 M. Thereafter, a non-aqueous electrolyte solution was prepared by adding 0.5 g of the oligomer represented by Formula 1a (weight-average molecular weight: 3,500, m1=3, n1=5) and 3 g of vinylene carbonate as additives to 96.5 g of the non-aqueous organic solvent.

(Electrode Assembly Preparation)

A positive electrode active material ($LiNi_{1/3}Co_{1/3}Mn_{1/3}O_2$; NCM), a conductive agent (carbon black), and a binder (polyvinylidene fluoride; PVDF) were added in a weight ratio of 94:3:3 to N-methyl-2-pyrrolidone (NMP), as a solvent, to prepare a positive electrode slurry. An about 20 μm thick aluminum (Al) thin film, as a positive electrode collector, was coated with the positive electrode slurry and dried, and the coated Al thin film was then roll-pressed to prepare a positive electrode.

A negative electrode active material (carbon powder), a conductive agent (carbon black), and a binder (polyvinylidene fluoride; PVDF) were added in a weight ratio of 96:1:3 to NMP, as a solvent, to prepare a negative electrode slurry. A 10 μm thick copper (Cu) thin film, as a negative electrode collector, was coated with the negative electrode slurry and dried, and the coated Cu thin film was then roll-pressed to prepare a negative electrode.

An electrode assembly was prepared by sequentially stacking the positive electrode, the negative electrode, and a separator formed of three layers of polypropylene/polyethylene/polypropylene (PP/PE/PP).

(Secondary Battery Preparation)

A stack cell with a capacity of 2 Ah (bi-cell (A type+C type, 7 stacks, width×length×height=38×37×59 size cell) was prepared by accommodating the assembled electrode assembly in a battery case. After the non-aqueous electrolyte solution was injected into the stack cell, the stack cell was stored at room temperature for 3 days, was subjected to formation by being charged at 1 C rate for 3 hours at 45° C. at a voltage of 3 V to a state of charge (SOC) of 50%, and then thermally cured by being stored at 60° C. for 24 hours. Subsequently, degassing and hot-pressing processes were performed to prepare a pouch type lithium secondary battery.

Example 2

A non-aqueous electrolyte solution and a lithium secondary battery including the same were prepared in the same manner as in Example 1 except that $LiPF_6$ was dissolved to have a concentration of 2.0 M during the preparation of a non-aqueous organic solvent.

Example 3

A non-aqueous electrolyte solution and a lithium secondary battery including the same were prepared in the same manner as in Example 1 except that $LiPF_6$ was dissolved to have a concentration of 2.5 M during the preparation of a non-aqueous organic solvent.

Example 4

A non-aqueous electrolyte solution and a lithium secondary battery including the same were prepared in the same manner as in Example 1 except that $LiPF_6$ was dissolved to have a concentration of 3.0 M during the preparation of a non-aqueous organic solvent.

Example 5

After 10 g of ethylene carbonate and 67 g (volume ratio of about 1:8.8) of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 20 g of the oligomer represented by Formula 1a (weight-average molecular weight: 3,500, m1=3, n1=5) and 3 g of vinylene carbonate as additives to 77 g of the non-aqueous organic solvent.

Example 6

After 5 g of ethylene carbonate and 91.5 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 0.5 g of the oligomer represented by Formula 1a (weight-average molecular weight: 3,500, m1=3, n1=5) and 3 g of vinylene carbonate as additives to 96.5 g of the non-aqueous organic solvent.

Example 7

After 10 g of ethylene carbonate and 86.5 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 0.5 g of the oligomer represented by Formula 1a (weight-average molecular weight: 3,500, m1=3, n1=5) and 3 g of vinylene carbonate as additives to 96.5 g of the non-aqueous organic solvent.

Example 8

After 1 g of ethylene carbonate and 95.9 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 0.1 g of the oligomer represented by Formula 1a (weight-average molecular weight: 3,500, m1=3, n1=5) and 3 g of vinylene carbonate as additives to 96.9 g of the non-aqueous organic solvent.

Example 9

After 3 g of ethylene carbonate and 84 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 10 g of the oligomer represented by Formula 1a (weight-average molecular weight: 3,500, m1=3, n1=5) and 3 g of vinylene carbonate as additives to 87 g of the non-aqueous organic solvent.

Example 10

After 3 g of ethylene carbonate and 93.5 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 0.5 g of the oligomer represented by Formula 1a (weight-average molecular weight: 3,500, m1=3, n1=5) and 3 g of vinylene carbonate as additives to 96.5 g of the non-aqueous organic solvent.

Example 11

After 12 g of ethylene carbonate and 75 g of ethyl methyl carbonate were mixed, a non-aqueous organic solvent was prepared by dissolving $LiPF_6$ to have a concentration of 1.5 M. Thereafter, a lithium secondary battery including a non-aqueous electrolyte solution was prepared in the same manner as in Example 1 except that the non-aqueous electrolyte solution was prepared by adding 10 g of the oligomer represented by Formula 1a (weight-average molecular weight: 3,500, m1=3, n1=5) and 3 g of vinylene carbonate as additives to 87 g of the non-aqueous organic solvent.

Example 12

After 10 g of ethylene carbonate and 62 g of ethyl methyl carbonate were mixed, a non-aqueous organic solvent was prepared by dissolving LiPF$_6$ to have a concentration of 1.5 M. Thereafter, a lithium secondary battery including a non-aqueous electrolyte solution was prepared in the same manner as in Example 1 except that the non-aqueous electrolyte solution was prepared by adding 25 g of the oligomer represented by Formula 1a (weight-average molecular weight: 3,500, m1=3, n1=5) and 3 g of vinylene carbonate as additives to 72 g of the non-aqueous organic solvent.

Comparative Example 1

A non-aqueous electrolyte solution and a lithium secondary battery including the same were prepared in the same manner as in Example 1 except that LiPF$_6$ was dissolved to have a concentration of 3.5 M during the preparation of a non-aqueous organic solvent.

Comparative Example 2

After 20 g of ethylene carbonate and 76.5 g of ethyl methyl carbonate were mixed, a non-aqueous organic solvent was prepared by dissolving LiPF$_6$ to have a concentration of 1.5 M. Thereafter, a lithium secondary battery including a non-aqueous electrolyte solution was prepared in the same manner as in Comparative Example 1 except that the non-aqueous electrolyte solution was prepared by adding 0.5 g of the oligomer represented by Formula 1a (weight-average molecular weight: 3,500, m1=3, n1=5) and 3 g of vinylene carbonate as additives to 96.5 g of the non-aqueous organic solvent.

Comparative Example 3

After 15 g of ethylene carbonate and 62 g of ethyl methyl carbonate were mixed, a non-aqueous organic solvent was prepared by dissolving LiPF$_6$ to have a concentration of 1.5 M. Thereafter, a lithium secondary battery including a non-aqueous electrolyte solution was prepared in the same manner as in Comparative Example 1 except that the non-aqueous electrolyte solution was prepared by adding 20 g of the oligomer represented by Formula 1a (weight-average molecular weight: 3,500, m1=3, n1=5) and 3 g of vinylene carbonate as additives to 77 g of the non-aqueous organic solvent.

Comparative Example 4

After 10 g of ethylene carbonate and 87 g of ethyl methyl carbonate were mixed, a non-aqueous organic solvent was prepared by dissolving LiPF$_6$ to have a concentration of 1.5 M. Thereafter, a lithium secondary battery including a non-aqueous electrolyte solution was prepared in the same manner as in Comparative Example 1 except that the non-aqueous electrolyte solution was prepared by adding 3 g of vinylene carbonate as an additive to 97 g of the non-aqueous organic solvent.

Comparative Example 5

After 20 g of ethylene carbonate and 62 g (volume ratio of about 2:8) of ethyl methyl carbonate were mixed, a non-aqueous organic solvent was prepared by dissolving LiPF$_6$ to have a concentration of 1.5 M. Thereafter, a lithium secondary battery including a non-aqueous electrolyte solution was prepared in the same manner as in Comparative Example 1 except that the non-aqueous electrolyte solution was prepared by adding 15 g of the oligomer represented by Formula 1a (weight-average molecular weight: 3,500, m1=3, n1=5) and 3 g of vinylene carbonate as additives to 82 g of the non-aqueous organic solvent.

TABLE 1

| | Lithium salt | | Amount of first organic solvent (EC) added (g) | Second organic solvent | | Amount of oligomer of Formula 1 added (g) | Second additive | |
|---|---|---|---|---|---|---|---|---|
| Examples | Concentration | Type | | Compound | Addition amount (g) | | Compound | Addition amount (g) |
| Example 1 | 1.5M | LiPF$_6$ | 10 | EMC | 86.5 | 0.5 | VC | 3 |
| Example 2 | 2.0M | LiPF$_6$ | 10 | EMC | 86.5 | 0.5 | VC | 3 |
| Example 3 | 2.5M | LiPF$_6$ | 10 | EMC | 86.5 | 0.5 | VC | 3 |
| Example 4 | 3.0M | LiPF$_6$ | 10 | EMC | 86.5 | 0.5 | VC | 3 |
| Example 5 | 1.5M | LiPF$_6$ | 10 | EMC | 67.0 | 20 | VC | 3 |
| Example 6 | 1.5M | LiPF$_6$ | 5 | EMC | 91.5 | 0.5 | VC | 3 |
| Example 7 | 1.5M | LiPF$_6$ | 10 | DMC | 86.5 | 0.5 | VC | 3 |
| Example 8 | 1.5M | LiPF$_6$ | 1 | EMC | 95.9 | 0.1 | VC | 3 |
| Example 9 | 1.5M | LiPF$_6$ | 3 | EMC | 84 | 10 | VC | 3 |
| Example 10 | 1.5M | LiPF$_6$ | 3 | EMC | 93.5 | 0.5 | VC | 3 |
| Example 11 | 1.5M | LiPF$_6$ | 12 | EMC | 75.0 | 10 | VC | 3 |
| Example 12 | 1.5M | LiPF$_6$ | 10 | EMC | 62.0 | 25 | VC | 3 |
| Comparative Example 1 | 3.5M | LiPF$_6$ | 10 | EMC | 86.5 | 0.5 | VC | 3 |
| Comparative Example 2 | 1.5M | LiPF$_6$ | 20 | EMC | 76.5 | 0.5 | VC | 3 |
| Comparative Example 3 | 1.5M | LiPF$_6$ | 15 | EMC | 62 | 20 | VC | 3 |
| Comparative Example 4 | 1.5M | LiPF$_6$ | 10 | EMC | 87 | — | VC | 3 |
| Comparative Example 5 | 1.5M | LiPF$_6$ | 20 | EMC | 62 | 15 | VC | 3 |

Experimental Examples

Experimental Example 1: Evaluation of Thickness Change Rate During High-Temperature Storage After the lithium secondary batteries prepared in Examples 1 to 12 and the lithium secondary batteries prepared in Comparative Examples 1 to 4 were respectively fully-charged (SOC 100%) at 0.33 C to 4.2 V and then stored at 60° C. for 10 weeks, a volume increase rate (thickness change rate) relative to 0 week was then measured.

With respect to the volume increase rate, the lithium secondary before the high-temperature storage was put in a bowl filled with ethanol at 25° C., an initial volume was measured using TWD-PLS, TWD-150DM equipment, the lithium secondary battery after the high-temperature storage for 10 weeks was put in the bowl, and a volume of the lithium secondary battery increased relative to 0 week was calculated from the increase volume of ethanol. The results were calculated as a percentage (%) and presented in Table 2 below.

TABLE 2

|  | Volume increase rate after storage at 60° C. for 10 weeks (%) |
| --- | --- |
| Example 1 | 3.5 |
| Example 2 | 3.7 |
| Example 3 | 4.1 |
| Example 4 | 5.3 |
| Example 5 | 3.1 |
| Example 6 | 3.2 |
| Example 7 | 7.5 |
| Example 8 | 8.2 |
| Example 9 | 4.8 |
| Example 10 | 5.1 |
| Example 11 | 4.0 |
| Example 12 | 2.9 |
| Comparative Example 1 | 10.6 |
| Comparative Example 2 | 22.7 |
| Comparative Example 3 | 21.5 |
| Comparative Example 4 | 30.7 |

Referring to Table 2, with respect to the lithium secondary batteries prepared in Examples 1 to 12 including the non-aqueous electrolyte solution of the present invention, it may be understood that a volume increase rate after high-temperature storage was 8.2% or less. Particularly, with respect to the lithium secondary battery of Example 12 having a high oligomer content and a high ethylene carbonate content, it may be understood that, since a robust film was formed on the surface of the negative electrode, the volume increase rate was the lowest at 2.9%.

In contrast, volume increase rates after high-temperature storage of the lithium secondary battery of Comparative Example 1 including the non-aqueous electrolyte solution with a high lithium salt concentration and the lithium secondary batteries of Comparative Examples 2 and 3 including the non-aqueous electrolyte solution with a high ethylene carbonate content were 10.6% or more, wherein it may be understood that their volume increase rates were significantly increased in comparison to those of the lithium secondary batteries of Examples 1 to 12 of the present invention. Particularly, a volume increase rate after high-temperature storage of the lithium secondary battery of Comparative Example 4 without the oligomer represented by Formula 1 was 30.7%, wherein it may be understood that the volume increase rate was significantly inferior to those of the lithium secondary batteries of Examples 1 to 12 of the present invention.

Experimental Example 2: Discharge Capacity Evaluation

After the lithium secondary batteries prepared in Examples 1 to 12 and the lithium secondary batteries prepared in Comparative Examples 1, 4 and 5 were respectively fully-charged at a rate of 0.33 C to 4.2 V under a constant current-constant voltage condition and a state of charge (SOC) of each lithium secondary battery was set to 50%, each lithium secondary battery was discharged at a rate of 2.5 C for 10 seconds to measure initial discharge capacity. After the above charging and discharging were set as one cycle and 3 cycles were performed, discharge capacity after the 3 cycles was measured, and the results thereof are presented in Table 3 below. The discharge capacity was measured using PNE-0506 charge/discharge equipment (manufacturer: PNE SOLUTION Co., Ltd., 5 V, 6 A).

TABLE 3

|  | 0.33 C discharge capacity (mAh) |
| --- | --- |
| Example 1 | 2010 |
| Example 2 | 1995 |
| Example 3 | 1982 |
| Example 4 | 1963 |
| Example 5 | 1927 |
| Example 6 | 2001 |
| Example 7 | 2023 |
| Example 8 | 1890 |
| Example 9 | 1931 |
| Example 10 | 1923 |
| Example 11 | 1920 |
| Example 12 | 1830 |
| Comparative Example 1 | 1720 |
| Comparative Example 4 | 1620 |
| Comparative Example 5 | 1592 |

Referring to Table 3, with respect to the lithium secondary batteries prepared in Examples 1 to 12 including the non-aqueous electrolyte solution of the present invention, it may be understood that most of discharge capacities after 3 cycles were 1,830 mAh or more.

In contrast, it may be understood that discharge capacities after 3 cycles of the lithium secondary battery of Comparative Example 1 including the non-aqueous electrolyte solution with a high lithium salt concentration, the lithium secondary battery of Comparative Example 4 without the oligomer represented by Formula 1, and the lithium secondary battery of Comparative Example 5 including the non-aqueous electrolyte solution having a high ethylene carbonate content were significantly inferior to those of the lithium secondary batteries of Examples 1 to 11 of the present invention.

The discharge capacity after 3 cycles of the lithium secondary battery of Example 12 including the non-aqueous electrolyte solution having a large amount of the oligomer represented by Formula 1 was 1,830 mAh, wherein it may be understood that the discharge capacity was decreased in comparison to that of the lithium secondary battery prepared in Example 5 which contained 20 wt % of the oligomer.

Experimental Example 3: Resistance Characteristics Evaluation at Room Temperature (25° C.)

After the lithium secondary batteries prepared in Examples 1 to 12 and the lithium secondary batteries prepared in Comparative Examples 1 and 3 to 5 were respectively fully-charged at a rate of 0.33 C to 4.2 V under a constant current-constant voltage condition and a state of charge (SOC) of each lithium secondary battery was set to 50%, a voltage drop, which occurred when each lithium secondary battery was initially discharged at a rate of 2.5 C for 10 seconds, was measured using the PNE-0506 charge/discharge equipment (manufacturer: PNE SOLUTION Co., Ltd., 5 V, 6 A). Resistance of each cell was measured by the voltage drop obtained, and the results thereof are listed in Table 4 below.

TABLE 4

|  | 25° C. 2.5 C, 10 sec resistance (mohm) |
| --- | --- |
| Example 1 | 38.6 |
| Example 2 | 39.2 |
| Example 3 | 39.8 |
| Example 4 | 41.2 |
| Example 5 | 43.5 |
| Example 6 | 38.9 |
| Example 7 | 37.1 |
| Example 8 | 44.5 |
| Example 9 | 43.1 |
| Example 10 | 43.4 |
| Example 11 | 43.5 |
| Example 12 | 46.1 |
| Comparative Example 1 | 46.5 |
| Comparative Example 3 | 49.5 |
| Comparative Example 4 | 52.6 |
| Comparative Example 5 | 55.1 |

Referring to Table 4, if resistance values of the lithium secondary batteries prepared in Examples 1 to 11 including the non-aqueous electrolyte solution of the present invention were checked, the resistance values were low at 43.5 mohm or less, but it may be understood that most of resistance values of the lithium secondary battery of Comparative Example 1 including the non-aqueous electrolyte solution with a high lithium salt concentration, the lithium secondary batteries of Comparative Examples 3 and 5 including the non-aqueous electrolyte solution having a high ethylene carbonate content, and the lithium secondary battery of Comparative Example 4 without the oligomer represented by Formula 1 were significantly increased to 46.5 mohm or more.

With respect to the lithium secondary battery of Example 12 including the non-aqueous electrolyte solution having an excessive amount of the oligomer represented by Formula 1, its resistance value was 46.1 mohm, wherein it may be understood that the resistance value was increased in comparison to those of the lithium secondary batteries prepared in Examples 1 to 11.

Experimental Example 4: Resistance Characteristics Evaluation at Low Temperature (−10° C.)

After the lithium secondary batteries prepared in Examples 1 to 12 and the lithium secondary batteries prepared in Comparative Examples 1 to 4 were respectively fully-charged at a rate of 0.33 C to 4.2 V under a constant current-constant voltage condition and a state of charge (SOC) of each lithium secondary battery was set to 50%, each lithium secondary battery was discharged at a rate of 2.5 C for 10 seconds to perform charge and discharge.

Next, after aging at −10° C. for 3 hours, a voltage drop, which occurred when each lithium secondary battery was discharged at a rate of 2.5 C for 10 seconds at an SOC of 50% (about 3.67 V), was measured using the PNE-0506 charge/discharge equipment (manufacturer: PNE SOLUTION Co., Ltd., 5 V, 6 A). Resistance of each cell was measured by the voltage drop obtained, and the results thereof are listed in Table 5 below.

TABLE 5

|  | −10° C. 2.5 C, 10 sec resistance (mohm) |
| --- | --- |
| Example 1 | 90.1 |
| Example 2 | 95.3 |
| Example 3 | 101.5 |
| Example 4 | 120.5 |
| Example 5 | 99.4 |
| Example 6 | 91.3 |
| Example 7 | 150.3 |
| Example 8 | 149.5 |
| Example 9 | 151.4 |
| Example 10 | 152.2 |
| Example 11 | 153.5 |
| Example 12 | 160.2 |
| Comparative Example 1 | 170.5 |
| Comparative Example 2 | 264.2 |
| Comparative Example 3 | 312.4 |
| Comparative Example 4 | 351.2 |

Referring to Table 5, if resistance values of the lithium secondary batteries prepared in Examples 1 to 12 including the non-aqueous electrolyte solution of the present invention were checked, the resistance values at a low temperature were about 160.2 mohm or less, but it may be understood that most of resistance values of the lithium secondary battery of Comparative Example 1 including the non-aqueous electrolyte solution with a high lithium salt concentration, the lithium secondary batteries of Comparative Examples 2 and 3 including the non-aqueous electrolyte solution having a high ethylene carbonate content, and the lithium secondary battery of Comparative Example 4 without the oligomer represented by Formula 1 were significantly increased to 170.5 mohm or more.

With respect to the lithium secondary battery of Example 12 including the non-aqueous electrolyte solution having an excessive amount of the oligomer represented by Formula 1, its resistance value was 160.2 mohm, wherein it may be understood that the resistance value was increased in comparison to those of the lithium secondary batteries prepared in Examples 1 to 11.

Experimental Example 5: Cycle Life Characteristics Evaluation Test

The lithium secondary batteries prepared in Examples to 11 and the lithium secondary batteries prepared in Comparative Examples 1 to 4 were respectively charged at a rate of 0.33 C to 4.2 V under a constant current condition and charged at a constant voltage of 4.2 V, the charge was terminated when a charge current became 0.275 mA, and the lithium secondary batteries were then left standing for 10 minutes and discharged at a constant current of 0.5 C to 3.0 V. The above charging and discharging were set as one cycle, and 300 cycles of charging and discharging were performed. In this case, discharge capacity after the first cycle and discharge capacity after a 300th cycle were measured using the PNE-0506 charge/discharge equipment (manufacturer: PNE SOLUTION Co., Ltd., 5 V, 6 A), and capacity retention was calculated and presented in Table 6 below.

TABLE 6

|   | 300th capacity retention (%) |
|---|---|
| Example 1 | 85.2 |
| Example 2 | 82.3 |
| Example 3 | 79 |
| Example 4 | 75.2 |
| Example 5 | 72.6 |
| Example 6 | 79.7 |
| Example 7 | 82 |
| Example 8 | 78.5 |
| Example 9 | 77.1 |
| Example 10 | 71.9 |
| Example 11 | 77.5 |
| Example 12 | 67.2 |
| Comparative Example 1 | 68.1 |
| Comparative Example 2 | 65.8 |
| Comparative Example 3 | 58.4 |
| Comparative Example 4 | 51.2 |

As illustrated in Table 6, it may be understood that the lithium secondary batteries prepared in Examples 1 to 11 including the non-aqueous electrolyte solution of the present invention had a capacity retention (%) after 300 cycles of 71.9% or more.

In contrast, it may be understood that most of capacity retentions after 300 cycles of the lithium secondary battery of Comparative Example 1 including the non-aqueous electrolyte solution with a high lithium salt concentration, the lithium secondary batteries of Comparative Examples 2 and including the non-aqueous electrolyte solution having a high ethylene carbonate content, and the lithium secondary battery of Comparative Example 4 without the oligomer represented by Formula 1 were significantly reduced to 68.1% or less.

With respect to the lithium secondary battery of Example 12 including the non-aqueous electrolyte solution having an excessive amount of the oligomer represented by Formula 1, its capacity retention after 300 cycles was 67.2%, wherein it may be understood that the capacity retention was reduced in comparison to those of the secondary batteries of Examples 1 to 11.

That is, with respect to the secondary battery of Example 12, since it included the non-aqueous electrolyte solution having an excessive amount of the oligomer represented by Formula 1, it may be understood that the thickness change rate during high-temperature storage, the discharge capacity, and the resistances at room temperature (25° C.) and low temperature (−10° C.) were improved in comparison to those of the secondary batteries of Comparative Examples 1 to 4, but cycle life characteristics were degraded in compassion to the secondary battery of Comparative Example 1. From these results, it may be confirmed that it is desirable for the non-aqueous solution of the present invention to include the oligomer represented by Formula 1 in an amount of 20 wt % or less.

The invention claimed is:

1. A non-aqueous electrolyte solution comprising:
a lithium salt;
a first organic solvent that is ethylene carbonate;
a second organic solvent excluding ethylene carbonate; and
an oligomer represented by Formula 1,
wherein the lithium salt is present in a concentration of 1.2 M to 3.3 M, and
wherein the first organic solvent is included in an amount of 0.1 wt % to 12 wt % based on a total weight of the non-aqueous electrolyte solution:

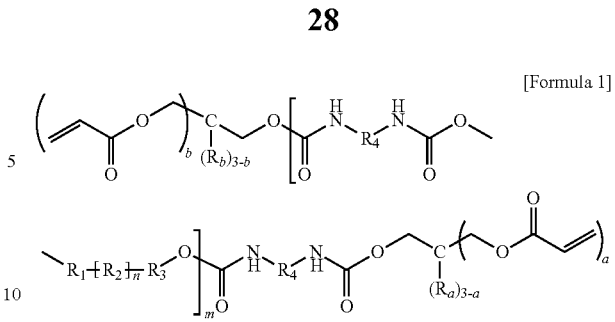

[Formula 1]

wherein, in Formula 1,
$R_1$ is an alkylene group having 1 to 5 carbon atoms which is substituted with at least one fluorine or $R_1'$—O—, wherein $R_1'$ is an alkylene group having 1 to 5 carbon atoms which is substituted with at least one fluorine,
$R_2$ is an alkylene group having 1 to 5 carbon atoms which is substituted with at least one fluorine or $R_2'$—O—, wherein $R_2'$ is an alkylene group having 1 to 5 carbon atoms which is substituted with at least one fluorine,
$R_3$ is an alkylene group having 1 to 5 carbon atoms which is substituted with at least one fluorine or $R_3'$—O—, wherein $R_3'$ is an alkylene group having 1 to 5 carbon atoms which is substituted with at least one fluorine,
$R_4$ is an aliphatic hydrocarbon group or an aromatic hydrocarbon group,
$R_a$ and $R_b$ are each independently hydrogen or an alkyl group having 1 to 3 carbon atoms,
m and n are each independently an integer of 1 to 5, and
a and b are each independently an integer of 1 to 3.

2. The non-aqueous electrolyte solution of claim 1, wherein the concentration of the lithium salt is in a range of 1.5 M to 3.3 M.

3. The non-aqueous electrolyte solution of claim 1, wherein the first organic solvent is included in an amount of 1 wt % to 10 wt % based on the total weight of the non-aqueous electrolyte solution.

4. The non-aqueous electrolyte solution of claim 1, wherein the second organic solvent comprises at least one of a cyclic carbonate-based organic solvent excluding the ethylene carbonate, a linear carbonate-based organic solvent, a linear ester-based organic solvent, or a cyclic ester-based organic solvent.

5. The non-aqueous electrolyte solution of claim 1, wherein the second organic solvent is a linear carbonate-based organic solvent.

6. The non-aqueous electrolyte solution of claim 1, wherein, in the oligomer represented by Formula 1, $R_1$ is $R_1'$—O—, wherein $R_1'$ is an alkylene group having 1 to 5 carbon atoms which is substituted with at least one fluorine, $R_2$ is $R_2'$—O—, wherein $R_2'$ is an alkylene group having 1 to 5 carbon atoms which is substituted with at least one fluorine, $R_3$ is an alkylene group having 1 to 5 carbon atoms which is substituted with at least one fluorine, and $R_4$ is an aliphatic hydrocarbon group.

7. The non-aqueous electrolyte solution of claim 1, wherein, in Formula 1, $R_1$ is $R_1'$—O—, wherein $R_1'$ is an alkylene group having 1 to 3 carbon atoms which is substituted with at least one fluorine, $R_2$ is $R_1'$—O—, wherein $R_2'$ is an alkylene group having 1 to 3 carbon atoms which is substituted with at least one fluorine, $R_3$ is an alkylene group having 1 to 3 carbon atoms which is substituted with at least one fluorine, and $R_4$ is an aliphatic hydrocarbon group.

8. The non-aqueous electrolyte solution of claim 1, wherein the oligomer represented by Formula 1 comprises an oligomer represented by Formula 1a:

[Formula 1a]

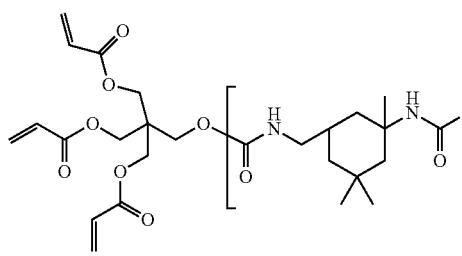 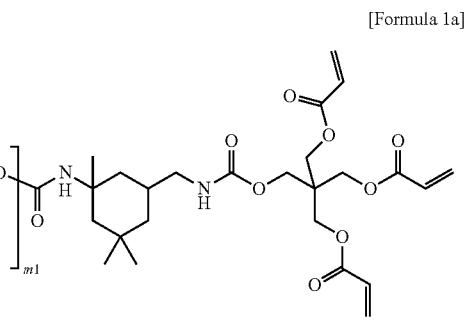

wherein, in Formula 1a,
m1 and n1 are each independently an integer of 1 to 5.

9. The non-aqueous electrolyte solution of claim 1, wherein the oligomer represented by Formula 1 is included in an amount of 0.1 wt % to 22 wt % based on the total weight of the non-aqueous electrolyte solution.

10. The non-aqueous electrolyte solution of claim 1, further comprising at least one of a fluorine-containing aromatic compound having 9 or less carbon atoms, a carbonate ester compound having an unsaturated bond, and an acid anhydride.

11. The non-aqueous electrolyte solution of claim 10,
wherein the fluorine-containing aromatic compound having 9 or less carbon atoms comprises at least one of fluorobenzene, 1,2-difluorobenzene, 1,3-difluorobenzene, 1,4-difluorobenzene, 1,2,3-trifluorobenzene, 1,2,4-trifluorobenzene, 1,3,5-trifluorobenzene, 1,2,3,4-tetra fluorobenzene, 1,2,3,5-tetra fluorobenzene, 1,2,4,5-tetra fluorobenzene, pentafluorobenzene, hexafluorobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, benzotrifluoride, 2-fluorobenzo trifluoride, 3-fluorobenzo trifluoride, 4-fluorobenzo trifluoride, 3-fluoro-o-xylene, 4-fluoro-o-xylene, 2-fluoro-m-xylene, 5-fluoro-m-xylene, 2-methylbenzo trifluoride, 3-methylbenzo trifluoride, 4-methylbenzo trifluoride, and or octafluorotoluene.

12. The non-aqueous electrolyte solution of claim 10, wherein the fluorine-containing aromatic compound having 9 or less carbon atoms is included in an amount of 0.01 wt % to 10 wt % based on the total weight of the non-aqueous electrolyte solution.

13. The non-aqueous electrolyte solution of claim 10, wherein the carbonate ester compound having an unsaturated bond comprises at least one of vinylene carbonate, methyl vinylene carbonate, ethyl vinylene carbonate, 4,5-dimethylvinylene carbonate, 4,5-diethyl vinylene carbonate, fluoroethylene carbonate, trifluoromethyl vinylene carbonate, 4-vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, 4,5-divinyl ethylene carbonate, 4,4-dimethyl-5-methylene ethylene carbonate, or 4,4-diethyl-5-methylene ethylene carbonate.

14. The non-aqueous electrolyte solution of claim 10, wherein the carbonate ester compound having an unsaturated bond is included in an amount of 0.01 wt % to 10 wt % based on the total weight of the non-aqueous electrolyte solution.

15. The non-aqueous electrolyte solution of claim 10, wherein the acid anhydride comprises at least one of succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, or phenylsuccinic anhydride.

16. The non-aqueous electrolyte solution of claim 10, wherein the acid anhydride is included in an amount of 0.01 wt % to 10 wt % based on the total weight of the non-aqueous electrolyte solution.

17. A lithium secondary battery comprising the non-aqueous electrolyte solution of claim 1.

* * * * *